United States Patent [19]

Reynolds

[11] 4,344,009

[45] Aug. 10, 1982

[54] BRUSH WEAR INDICATOR FOR A DYNAMOELECTRIC MACHINE BRUSH

[75] Inventor: Kenneth R. Reynolds, North East, Pa.

[73] Assignee: General Electric Co., Schenectady, N.Y.

[21] Appl. No.: 183,896

[22] Filed: Sep. 4, 1980

[51] Int. Cl.$^3$ .............................................. H02K 13/00

[52] U.S. Cl. ..................................... 310/242; 310/245; 200/61.4; 200/277; 318/542

[58] Field of Search ................................ 310/239-242, 310/244-247, 73, 71, 68 R, 229, 230, DIG. 6; 318/542; 339/5 M, 5 PL, 5 RL; 200/61.4, 61.41, 277

[56] References Cited

U.S. PATENT DOCUMENTS

| | | | |
|---|---|---|---|
| 2,691,114 | 10/1954 | Lykins | 310/246 |
| 3,523,288 | 8/1970 | Thompson | 310/245 |
| 4,121,207 | 10/1978 | Jones | 200/61.4 |
| 4,172,988 | 10/1979 | Lowther | 310/245 |
| 4,272,695 | 6/1981 | Buchwald et al. | 310/242 |

*Primary Examiner*—R. Skudy
*Attorney, Agent, or Firm*—Vale P. Myles

[57] ABSTRACT

A brush wear indicator for a dynamoelectric machine including a brush holder for slidably mounting a brush, a self-winding, brush-biasing spring having one of its ends mounted in fixed relationship on the brush holder, in combination with a circuit board having a dielectric member on which a plurality of electrical contacts are mounted in spaced relationship to be electrically engaged by the spring when it is fully extended to accept a new brush in the brush holder. As the brush wears, the spring moves downward to continue exerting a biasing force on the brush, and sequentially moves out of engagement with the contacts on the circuit board responsive to predetermined degrees of brush wear occurring. Such movement of the spring causes the contacts to be sequentially disengaged from the spring, thereby causing associated signal means, such as glow lamps, to be de-energized thus indicating the occurrence of the predetermined degrees of brush wear.

6 Claims, 3 Drawing Figures

BRUSH WEAR INDICATOR FOR A DYNAMOELECTRIC MACHINE BRUSH

BACKGROUND OF THE INVENTION

The invention relates to brush wear indicators for use with dynamoelectric machines and, more particularly, relates to a brush wear indicator that employs a brush-biasing spring as an active switch element for controlling a brush wear signaling circuit.

The use of brushes in dynamoelectric machines to conduct current from a rotating element, such as a commutator or slip ring, to a fixed electrical circuit is well known. In order to keep such circuits functioning properly, it is necessary to assure that the brushes are in good condition and are biased against the rotating conducting surface with a predetermined force. To accomplish these important objectives in most prior art dynamoelectric machines, it is necessary to periodically inspect the condition of the brushes in order to make sure that they are replaced before the brushes become so completely worn that they either fail to engage the rotating conductive commutator or slip ring with sufficient pressure to properly conduct current, or to make sure that neither the brush-biasing spring, nor a conductor embedded in the brush, engages the rotating commutator or slip ring thereby causing damage to it. Such required periodic inspections are frequently inconvenient to perform due to the relative inaccessibility of the brushes and associated brush holders, and in any event pose a nuisance to users of the different machines.

In recognition of those problems, several different types of brush wear indicators have already been developed. For example in U.S. Pat. No. 2,691,114-Lykins, which issued on Oct. 5, 1964, there is disclosed a torsion-spring arrangement for biasing a brush-follower arm against the outer end of a brush to hold it in engagement with a rotating conductive surface. The spring-biased arm is also effective to move a switch contact arm against a fixed switch contact when a predetermined degree of brush wear has occurred, thereby allowing the rigid brush-follower arm and its associated movable switch contact to move downward by a predetermined distance into contact with the fixed electrical contact of the switch. Responsive to closure of the switch, an associated signal is energized to alert maintenance personnel, or an operator of the machine, that the predetermined degree of brush wear has taken place. Another type of brush wear indicating mechanism is shown in U.S. Pat. No. 3,523,288-Thompson, which issued on Aug. 7, 1970. The indicating system disclosed in that patent comprises a spring-biased pin that is mounted in sliding relationship with one side of a carbon brush so that as the brush wears the pin is moved over a recess in the side of the brush and drops into the recess causing a signal circuit switch to be closed with a snap action. Again, closure of the switch alerts an operator to the predetermined degree of brush wear. This patent discloses a signaling circuit in which a normally closed switch is used to energize a signal means, such as a lamp, when the brush is in excess of a preselected given length. When the brush is worn to decrease its length below the preselected length, the normally closed switch is opened thereby extinguishing the signal lamp.

A patent quite similar to the above-noted Thompson patent is U.S. Pat. No. 4,121,270-Jones, which issued on Oct. 17, 1972 and discloses a brush wear indicator having an enclosed microswitch in combination with a switch actuating arm that rolls on one side of a brush. When the brush wears to a predetermined length, the switch-actuating arm rolls off the outer end of the brush and causes the switch to be closed with a snap action. In still another U.S. Pat. No. 4,172,988-Lowther, which issued on Oct. 30, 1979, there is disclosed a brush wear indicator in which an electrical contact mounted on the outer end of a brush is moved into engagement with a fixed contact mounted on an insulating member in the path of travel of the brush-mounted contact. In operation, when the brush is moved downward by a self-winding, brush-biasing spring, responsive to the brush being worn away by its sliding relationship with an associated slip ring or commutator on which it rides, the brush-mounted contact is moved into engagement with the fixed contact and completes a circuit, thereby energizing an indicating signal that alerts an operator to the predetermined degree of brush wear. Finally, in a co-pending U.S. Patent application having Ser. No. 183,920, there is disclosed a brush wear indicator that was conceived after the invention described herein, and that utilizes a self-winding, brush-biasing spring as an active switching element of a brush wear indicating assembly. Specifically, a coiled portion of the spring is operable to roll into engagement with either a flexible contact mounted adjacent a fixed end of the spring, or into actuating relationship with a switch mounted in the path of travel of the coiled portion of the spring, thereby to complete a circuit that energizes an indicating means to signal an operator of a predetermined degree of brush wear.

All of the brush wear indicator devices described in the patents and patent application mentioned above both differ from the invention described herein in that they either require the use of auxiliary switch actuating means, or switches, in addition to the spring brush-biasing mechanism of the associated brush holder assembly, or they require specialized, flexible contacts that can be mounted on and engaged by a self-winding, brush-biasing spring, such as that disclosed in the Michael application. Accordingly, it is a primary object of the present invention to provide a brush wear indicator for dynamoelectric machines that is characterized by providing a reliable and commercially feasible brush wear sensor and associated indicating circuit that utilizes a self-winding, brush-biasing spring as an active switch element of the indicating circuit, in combination with a simple printed circuit board type of fixed contact arrangement to avoid the relatively greater costs of prior art brush wear indicators while achieving desired advantages of greater reliability and lower manufacturing cost.

Another object of the invention is to provide a brush wear indicator that utilizes a conductive self-winding, brush-biasing spring as an electrically conductive element that effectively completes an electrical circuit between at least two contacts of an associated indicating circuit when a brush mounted in a holder adjacent the spring is in a relatively unworn condition, but is also operable to open the indicating circuit responsive to the brush being worn sufficiently to allow the biasing spring to move out of engagement with one of the fixed contacts.

Still another object of the invention is to provide a brush wear indicator that includes a printed circuit board type of indicating circuit element that readily affords an indication of a plurality of different degrees of brush wear, without requiring the use of a plurality of separately actuated movable switching elements.

Further objects and advantages of the invention will become apparent to those skilled in the art from the description of it that follows considered in conjunction with the accompanying drawings.

SUMMARY OF THE INVENTION

In one preferred embodiment of the invention a brush wear indicator for a dynamoelectric machine is provided, which utilizes a self-winding, brush-biasing spring, in a relatively conventional type of brush holder supporting arrangement, to act as a switching means that controls a brush water indicating circuit. A plurality of electrical contacts are mounted in spaced relation to one another on a flat installing member so that each of the contacts is in the path of movement of the self-winding spring. When the spring is extended to accept a relatively new brush in the brush holder, all of the fixed contacts are placed in engagement with a flattened portion of the spring that is disposed generally parallel to one side of the brush. In this condition, the respective contacts are electrically joined in common to complete a circuit that includes at least one, and preferably several, separate indicating means, such as lamps. Responsive to a predetermined degree, or a variety of different predetermined degrees, of brush wear, the spring winds upon itself and sequentially moves out of engagement with the respective fixed contacts, thereby interrupting one branch of the indicating circuit at a time. When a branch of the indicating circuit having a glow lamp is interrupted, that glow lamp is turned off to indicate to an operator that the brush has worn to a given extent. As further wear of the brush occurs, the spring moves out of engagement with successive contacts and thereby de-energizes other indicating means in other branch circuits. Thus, an operator is able to determine, by simply observing the energized condition of the indicating lamps, just which predetermined degree of brush wear has occurred.

BRIEF DESCRIPTIONS OF THE DRAWINGS

Figure 1:
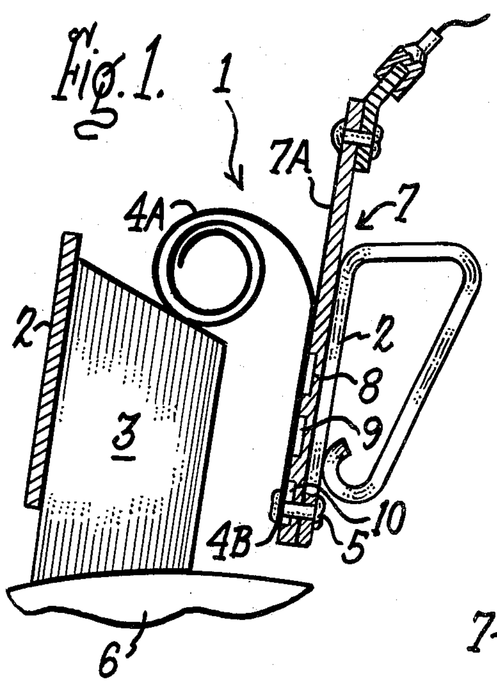
FIG. 1 is a schematic side elevation, partly in cross-section, illustrating a brush wear indicator constructed according to the invention and shown in relation to a brush holder, a brush and a fragment of a conductive surface, such as a slip ring or commutator.
Figure 2:
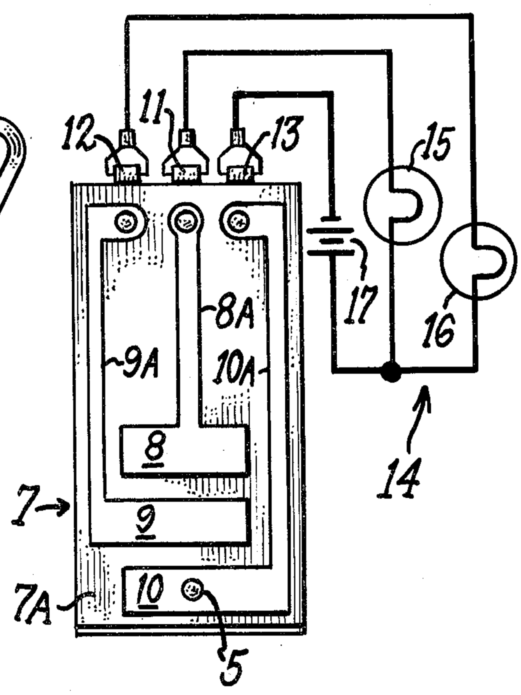
FIG. 2 is a top plan view of a printed-circuit type element of the brush wear assembly shown in FIG. 1, illustrated in connection with a schematic circuit diagram of an associated indicating circuit connected to the terminals of the brush wear indicator.
Figure 3:
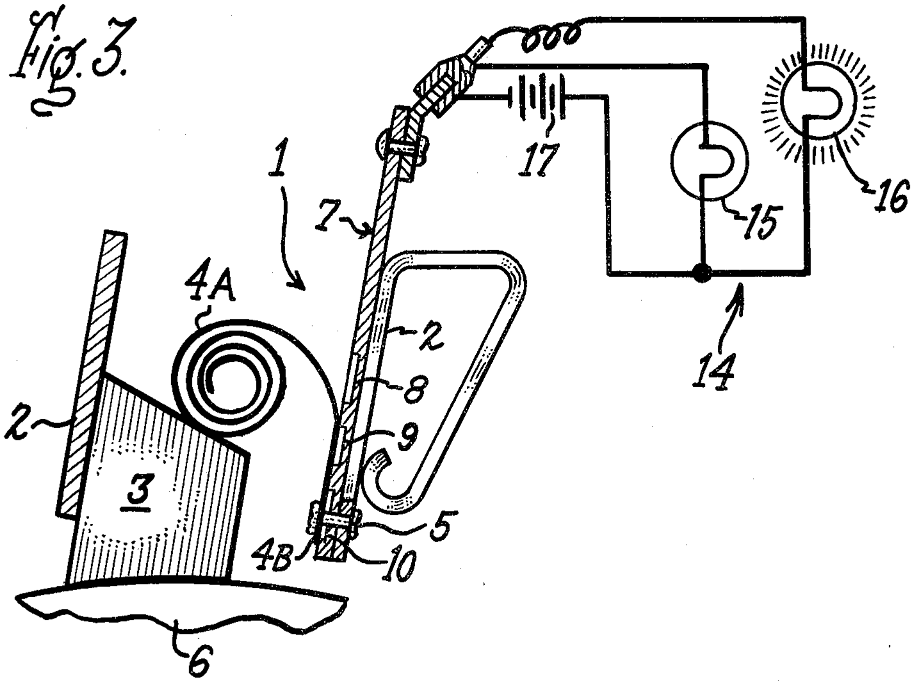

FIG. 3 is a schematic side elevation, partly in cross-section, showing a brush wear indicator such as that illustrated in FIG. 1, in combination with an indicating circuit such as that shown in FIG. 2, and depicting the brush-biasing, self-winding spring of the mechanism in a more fully coiled position than that illustrated in FIG. 1, in order to show the relative positions of the mechanism when an associated brush has worn by a predetermined extent.

DESCRIPTION OF THE PREFERRED EMBODIMENTS

Referring now to FIGS. 1, 2 and 3 of the drawing, a preferred embodiment of my invention will be described. Different views of the same structure are shown in the 3 figures of the drawing, accordingly, the same reference numerals will be used throughout the three figures to indicate like components of the preferred emodiment being described. Thus, there is shown a brush wear indicator 1 comprising a brush holder 2 in the form of a metal tube, having a generally rectangular cross-section transverse to its vertical axis for supporting a brush 3 in sliding relationship to the brush holder. A self-winding, brush-biasing spring 4 that includes a coiled portion 4A, and a relatively fixed end portion 4B, is mounted on the brush holder 2 by a suitable holding means, which in this embodiment is a rivet 5.

It will be recognized as the description of the invention proceeds that the brush holder 2 may be made of any suitable conventional configuration and may be constructed of conventional materials well known in the art. As will also become apparent as the description of the invention proceeds, the spring 4 should either be made of electrically conductive material, such as spring steel, or should be provided with a conductive portion near its fixed end 4B. For the purpose of describing the invention, there is shown in FIGS. 1 and 3 a fragmentary portion of a commutator or slip ring 6 on which the brush slides in a well known manner.

According to the invention, the brush wear indicator 1 includes in combination with the foregoing elements, a circuit board 7 comprising a dielectric member 7A, a plurality of electrical contacts 8, 9 and 10 mounted at spaced points on the dielectric member, a plurality of electric terminals 11, 12 and 13 also mounted at spaced points on the upper end of the dielectric member and a plurality of circuit means, such as the electrically conductive metal strips 8A, 9A and 10A and associated rivets at the upper end thereof, as seen in FIG. 2, connected to complete separate circuits between each of the contacts 8-10 and the respective terminal 11-13 associated therewith, as seen in FIG. 2. Any suitable conductive material, such as strips of copper, can be used to form the contacts 8–10 and associated, or integral, conductors 8A, 9A and 10A, as well as the terminals 11–13.

All of the contacts 8–10 are positioned in engagement with a relatively flat, extended portion of the spring 4 responsive to the spring being extended to apply a biasing force to a relatively unworn brush 3, such as that shown supported in the brush holder 2 in FIG. 1. As shown in FIG. 2, each of the contacts is positioned in alignment with the path of movement of the spring 4 so that at least some of the contacts are positioned to be sequentially disengaged from the spring 4 responsive to predetermined degrees of brush wear occurring that enable the spring to wind up and thus bend away from the contacts. Such a worn brush condition is illustrated in FIG. 3, where it can be seen that the coiled portion 4A of spring 4 has rolled up sufficiently to move the spring out of engagement with the upper-most fixed contact 8 on the circuit board 7. It will be apparent that if the brush continues to wear beyond the position shown in FIG. 3, the coiled portion 4A will continue to wind upon itself and cause the spring to be disengaged from the second contact 9.

In order to use this switching action of the self-winding spring to change the condition of a brush-wear indicating circuit, there is connected to the terminals 11–13 a signal means that is operable to indicate different predetermined degrees of brush wear responsive to the spring 4 being moved out of engagement with each of the respective contacts 8–10. In the preferred embodiment illustrated in FIGS. 2 and 3, the signal means 14 comprises a plurality of indicating devices, such as glow lamps 15 and 16, that are electrically connected in parallel between one of the contacts 10, which is positioned adjacent to a fixed end of the spring 4, as best seen in FIGS. 1 and 3, and the respective other contacts 8 and 10. A suitable source of electric power, such as a battery 17, is connected in series with the one contact 10 and the respective parallel circuits containing the lamps 15 and 16. Any suitable, conventional circuit means can be used to electrically connect the respective components of the signal means 14 to the respective terminals 11-12, as shown in FIGS. 2 and 3. Of course, alternative conventional signal means and associated circuitry can be used in lieu of the illustrated signal means 14 of the preferred embodiment.

As illustrated in FIGS. 1 and 3, the circuit board 7 in this embodiment of the invention is mounted on the brush holder 2 by being adhered thereto with a commercially available adhesive. Other conventional mounting means, such as the rivet 5 may also be employed for mounting the board 7 to the brush holder. In order for the spring 4 to operate as described above, by engaging the contacts 8–10, all of these contacts are positioned on the side of the dielectric member 7A facing the brush 3 which is supported in operating position within the brush holder 2. As seen in FIG. 2, in this embodiment of the invention the contacts 8–10 are arranged in general alignment with the path of movement of the spring 4, so that one of the contacts 10 is positioned at the lower end of the board adjacent to the fixed end 4B of the spring and is electrically connected thereto by the rivet 5 that also serves to mount the board 7 to the brush holder. Thus, as can be seen by examining FIGS. 1, 2 and 3, the spring 4 acts as a switch to complete an electrical circuit between the contact 10 and the other contacts 8 and 9 in engagement with the spring, as it is shown in FIG. 1. As the spring moves to different extended conditions determined, respectively, by different degrees of brush wear that enable the spring to wind on itself by varying amounts, one of these contacts, such as the contact 8 shown in FIG. 3, is disengaged from the spring, thus de-energizing signal lamp 15 to indicate a first predetermined degree of brush wear. Further downward movement of brush 3 enables spring 4 to coil more, and moves it out of engagement with the next contact 9, thereby de-energizing lamp 16 to indicate that more advanced stage of brush water.

It will be apparent to those skilled in the art that in other embodiments of the invention the brush wear indicator can be modified in various ways, for example the board 7 can be made so that only 2 contacts are contained on it. In such an embodiment one of the contacts is positioned adjacent to the fixed end of the spring 4 and the other contact is positioned in the path of movement of the spring 4 a selected distance from the first contact, which distance corresponds to a predetermined degree of wear of the brush 3 supported in the holder 2. Accordingly, as the spring 4 winds upon itself and moves out of engagement with the upper-most contact, the circuit theretofore completed between the contacts 8 and 10 would open and de-energize a suitably connected indicating lamp, such as lamp 15 shown in FIGS. 2 and 3 of the drawing.

Those skilled in the art will recognize that various other alternative embodiments of the invention may be made from the description of it presented therein; accordingly, it is my intention to encompass within the following claims the true spirit and scope of the invention.

What I claim as new and desire to secure by Letters Patent of the United States is:

1. A brush wear indicator comprising a brush holder for supporting a brush in sliding relationship thereto, a self-winding spring having one of its ends mounted in fixed position relative to the brush holder and having a coiled portion that is operable to apply a biasing force to a brush supported in said holder thereby biasing one end of the brush into engagement with a rotatable electrical conductor positioned adjacent to the holder, in combination with a circuit board comprising a dielectric member, a plurality of electrical contacts mounted at spaced points on said dielectric member, a plurality of electric terminals mounted at spaced points on said dielectric member, and electric circuit means connected to complete separate circuits between each of said contacts and a respective one of said terminals associated therewith, all of said contacts being positioned to be engaged by said spring responsive to the spring being extended to apply a biasing force to a relatively unworn brush supported in said holder and at least some of said contacts being positioned to be sequentially disengaged from the spring responsive to predetermined degrees of brush wear occurring that enable the spring to wind up and bend away from said contacts, and signal means electrically connected to said terminals and operable to indicate a different predetermined degree of brush wear responsive to said spring moving out of engagement with each of the respective contacts.

2. A brush wear indicator as defined in claim 1 wherein said circuit board is mounted on the brush holder, and all of said contacts on the circuit board are positioned on a side thereof facing a brush supported in the holder.

3. A brush wear indicator as defined in claim 2 wherein said contacts are spaced on the circuit board with one contact adjacent the fixed end of said spring and with the remaining contacts positioned at spaced points along the path of travel of the spring as it winds up, whereby said spring acts as a switch to complete an electrical circuit between said one contact adjacent the fixed end of the spring and the other contacts in engagement with the spring in its various extended conditions determined, respectively, by different degrees of brush wear that enable the spring to wind on itself by varying amounts.

4. A brush wear indicator as defined in claim 3 wherein said signal means comprises a plurality of indicating devices electrically connected in parallel with one another between said one contact adjacent the fixed end of the spring and the respective other contacts on said dielectric member, and a source of electric power connected in series with said one contact and the respective parallel circuits containing said indicating devices.

5. A brush wear indicator as defined in claim 1 wherein said plurality of contacts comprises at least two contacts, one of said contacts being positioned adjacent the fixed end of said spring, the other contact being positioned in the path of movement of said spring a selected distance from said one contact corresponding to a predetermined degree of wear of a brush supported in said brush holder.

6. A brush wear indicator for a dynamoelectric machine having a rotatably mounted conductor on which a brush is supported to ride in a brush holder relative to which the brush is slidably mounted to enable the brush to be moved toward the rotatably mounted conductor in order to maintain continuous engagement between the brush and conductor as the surface of the brush abutting the conductor is worn away thereby shortening the overall brush length, comprising, a circuit board mounted in fixed relation to the brush holder, a self-winding, brush-biasing spring having one of its ends mounted in fixed relation on the brush holder and having a coiled portion adjacent its opposite end, said circuit board being formed to comprise a dielectric member on which a plurality of spaced electrical contacts and a plurality of spaced terminals are mounted, each of said terminals being electrically connected, respectively, to one of said spaced contacts, all of said contacts on the circuit board being disposed in alignment with the path of movement of the self-winding spring whereby the spring is effective to electrically connect the contacts together responsive to the spring being extended sufficiently to accept a relatively unworn brush in the brush holder in a position such that the coiled portion of the spring rests on the outer end of the brush and biases it toward said rotatable conductor, said spring being effective as a switching member to sequentially open the circuits formed by the spring between the contacts responsive to the coiled portion of the spring winding upon itself as the brush wears enabling the spring to move the outer end of the brush toward the rotatable conductor, whereby various predetermined degrees of brush wear are indicated by sequential opening of the respective circuits connected to the aligned contacts, and a plurality of signal means electrically connected, respectively, between selected pairs of said contacts and each operable to produce a signal responsive to opening of the circuit between each pair of contacts, thereby alerting an operator of the dynamoelectric machine to the occurrence of the predetermined degrees of brush wear.

* * * * *

UNITED STATES PATENT AND TRADEMARK OFFICE

CERTIFICATE OF CORRECTION

PATENT NO. : 4,344,009

DATED : August 10, 1982

INVENTOR(S) : Kenneth R. Reynolds

It is certified that error appears in the above-identified patent and that said Letters Patent is hereby corrected as shown below:

Column 3, line 15, "water" should read -- wear --.

Column 5, line 49, "water" should read -- wear --.

Signed and Sealed this

*Twelfth* Day of *October 1982*

[SEAL]

*Attest:*

GERALD J. MOSSINGHOFF

*Attesting Officer* *Commissioner of Patents and Trademarks*